(12) United States Patent
Sha et al.

(10) Patent No.: US 12,075,489 B2
(45) Date of Patent: Aug. 27, 2024

(54) METHOD, APPARATUS, COMMUNICATION DEVICE AND STORAGE MEDIUM FOR RANDOM ACCESS

(71) Applicant: Beijing Xiaomi Mobile Software Co., Ltd., Beijing (CN)

(72) Inventors: Tong Sha, Beijing (CN); Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 393 days.

(21) Appl. No.: 17/595,921

(22) PCT Filed: May 31, 2019

(86) PCT No.: PCT/CN2019/089686
§ 371 (c)(1),
(2) Date: Nov. 29, 2021

(87) PCT Pub. No.: WO2020/237681
PCT Pub. Date: Dec. 3, 2020

(65) Prior Publication Data
US 2022/0322453 A1 Oct. 6, 2022

(51) Int. Cl.
*H04W 74/0833* (2024.01)
*H04L 1/08* (2006.01)
(Continued)

(52) U.S. Cl.
CPC .......... *H04W 74/0841* (2013.01); *H04L 1/08* (2013.01); *H04W 72/02* (2013.01); *H04W 72/0453* (2013.01); *H04W 74/0866* (2013.01)

(58) Field of Classification Search
CPC ............. H04W 74/0841; H04W 72/02; H04W 72/0453; H04W 74/0866; H04W 74/0833;
(Continued)

(56) References Cited

U.S. PATENT DOCUMENTS

2016/0192401 A1  6/2016 Park et al.
2018/0176949 A1*  6/2018 Islam ............... H04B 7/088
(Continued)

FOREIGN PATENT DOCUMENTS

CN    103945557 A    7/2014
CN    107690200 A    2/2018
(Continued)

OTHER PUBLICATIONS

"Procedure for 2-step RACH," Proceedings of the 3GPP TSG RAN WG1 #96bis, R1-1904281, Xi'an, China, Apr. 8, 2019, 6 pages.
(Continued)

*Primary Examiner* — Yu-Wen Chang
(74) *Attorney, Agent, or Firm* — McCoy Russell LLP (57) ABSTRACT

A method for random access includes: respectively configuring, in a frequency domain, an initial transmission resource pool and a re-transmission resource pool of a physical random access channel (PRACH), and frequency-domain resource in the initial transmission resource pool are used for initial transmission of a random access preamble, frequency-domain resource in the re-transmission resource pool are used for re-transmission of the random access preamble, and initial transmission frequency-domain resources in the initial transmission resource pool and re-transmission frequency-domain resources in the re-transmission resource pool have a one-to-one mapping relationship; and sending random access configuration information, the random access configuration information includes resource configuration information for the initial transmission resource pool and resource configuration information for the re-transmission resource pool.

17 Claims, 6 Drawing Sheets

(51) Int. Cl.
*H04W 72/02* (2009.01)
*H04W 72/0453* (2023.01)
*H04W 74/08* (2009.01)

(58) Field of Classification Search
CPC .... H04W 74/004; H04W 74/006; H04L 1/08; H04L 5/0053; H04L 5/0094
See application file for complete search history.

(56) References Cited

U.S. PATENT DOCUMENTS

| | | | | |
|---|---|---|---|---|
| 2018/0176957 A1* | 6/2018 | Zhang | | H04L 5/0053 |
| 2019/0215870 A1* | 7/2019 | Babaei | | H04L 5/0092 |
| 2019/0254082 A1* | 8/2019 | Takeda | | H04W 52/367 |
| 2019/0380152 A1* | 12/2019 | Abedini | | H04W 56/0045 |
| 2020/0059390 A1* | 2/2020 | Zhang | | H04L 1/0007 |
| 2020/0252972 A1* | 8/2020 | Rico Alvarino | | H04L 5/0094 |

FOREIGN PATENT DOCUMENTS

| | | | | |
|---|---|---|---|---|
| CN | 108282276 A | | 7/2018 | |
| CN | 108307506 A | | 7/2018 | |
| CN | 108476480 A | * | 8/2018 | ............ H04W 24/08 |
| CN | 108738030 A | | 11/2018 | |
| CN | 109257958 A | | 1/2019 | |
| CN | 109392156 A | | 2/2019 | |
| CN | 109804701 A | * | 5/2019 | .............. H04L 1/00 |
| WO | 2019031797 A1 | | 2/2019 | |

(56) References Cited

OTHER PUBLICATIONS

"Discussion on multiple Msg.1 transmission procedure," Proceedings of the 3GPP TSG RAN WG1 #96bis, R1-1904414, Xi'an, China, Apr. 8, 2019, 4 pages.

"[D312/322] RACH resources for contention-free RA including BFR," Proceedings of the 3GPP TSG-RAN WG2 #101, R2-1803627, Feb. 26, 2018, Athens, Greece, 5 pages.

ISA China National Intellectual Property Administration, International Search Report Issued in Application No. PCT/CN2019/089686, Feb. 26, 2020, WIPO, 4 pages.

* cited by examiner

METHOD, APPARATUS, COMMUNICATION DEVICE AND STORAGE MEDIUM FOR RANDOM ACCESS

CROSS REFERENCE TO RELATED APPLICATION

The present application is a U.S. National Phase of International Application No. PCT/CN2019/089686 entitled "RANDOM ACCESS METHOD AND APPARATUS, COMMUNICATION DEVICE AND STORAGE MEDIUM," and filed on May 31, 2019. The entire contents of the above-listed application is hereby incorporated by reference for all purposes.

TECHNICAL FIELD

The application relates to, but is not limited to, the field of wireless communication, in particular, to a method, an apparatus, a communication device and a storage medium for random access.

BACKGROUND AND SUMMARY

A terminal needs to establish an uplink connection with a base station through random access in order to establish uplink synchronization. In a contention-based random access process of NR Rel-15, the terminal or user equipment (UE) selects a random occasion (RO) in a configured selectable RO set and sends a random access preamble to the base station through a physical random access channel (PRACH), and then the terminal receives a random access response (RAR) from the base station in an RAR time window. The base station determines a random access-radio network temporary identifier (RA-RNTI) through a resource location of the PRACH and performs scrambling on the RAR through the RA-RNTI. The terminal judges whether a preamble serial number in the RAR is consistent with the previously sent one after receiving the RAR, and if yes, it is considered that the RAR is received successfully.

However, in these cases, a problem of a long random access time delay or a low success rate of the random access occurs sometimes.

Examples of the application discloses a method, a communication device and a storage medium for random access.

According to a first aspect of an example of the disclosure, a method for random access is provided and includes:
respectively configuring, in frequency domain, an initial transmission resource pool and a re-transmission resource pool of a physical random access channel (PRACH), frequency-domain resources in the initial transmission resource pool are used for initial transmission of a random access preamble, frequency-domain resources in the re-transmission resource pool are used for re-transmission of the random access preamble, and initial transmission frequency-domain resources in the initial transmission resource pool and re-transmission frequency-domain resources in the re-transmission resource pool have a one-to-one mapping relationship; and
sending random access configuration information, the random access configuration information includes: resource configuration information for the initial transmission resource pool and resource configuration information for the re-transmission resource pool.

According to a second aspect of an example of the disclosure, a method for random access is provided and includes:
randomly selecting an initial transmission frequency-domain resource in an initial transmission resource pool of the PRACH to initially transmit a random access preamble; and
selecting a re-transmission frequency-domain resource, corresponding to the initial transmission frequency-domain resource, in a re-transmission resource pool of the PRACH to re-transmit the random access preamble, and the initial transmission frequency-domain resources in the initial transmission resource pool and the re-transmission frequency-domain resources in the re-transmission resource pool have a one-to-one mapping relationship.

According to a third aspect of an example of the disclosure, a communication device is provided and includes:
an antenna;
a memory; and
a processor, connected with the antenna and the memory respectively, and configured to, by executing an executable program stored in the memory, control the antenna to transmit and receive a wireless signal and configured to:
respectively configure, in frequency domain, an initial transmission resource pool and a re-transmission resource pool of a physical random access channel (PRACH), wherein frequency-domain resources in the initial transmission resource pool are used for initial transmission of a random access preamble, frequency-domain resources in the re-transmission resource pool are used for re-transmission of the random access preamble, and initial transmission frequency-domain resources in the initial transmission resource pool and re-transmission frequency-domain resources in the re-transmission resource pool have a one-to-one mapping relationship; and
send random access configuration information, wherein the random access configuration information comprises resource configuration information for the initial transmission resource pool and resource configuration information for the re-transmission resource pool.

According to a fourth aspect of an example of the disclosure, a communication device is provided and includes:
an antenna;
a memory; and
a processor, connected with the antenna and the memory respectively, and configured to, by executing an executable program stored in the memory, control the antenna to transmit and receive a wireless signal and configured to:
randomly selecting an initial transmission frequency-domain resource in an initial transmission resource pool of a physical random access channel (PRACH) to initially transmit a random access preamble; and
selecting a re-transmission frequency-domain resource, corresponding to the initial transmission frequency-domain resource, in a re-transmission frequency-domain resource pool of the PRACH to re-transmit the random access preamble, wherein the initial transmission frequency-domain resources in the initial transmission resource pool and the re-transmission frequency-domain resources in the re-transmission resource pool have a one-to-one mapping relationship.

According to a fifth aspect of an example of the disclosure, a non-transitory computer readable storage medium is provided having an executable program stored thereon, and steps of a method for random access are implemented when the executable program is executed by a processor, the method comprises:

respectively configuring, in frequency domain, an initial transmission resource pool and a re-transmission resource pool of a physical random access channel (PRACH), wherein frequency-domain resources in the initial transmission resource pool are used for initial transmission of a random access preamble, frequency-domain resources in the re-transmission resource pool are used for re-transmission of the random access preamble, and initial transmission frequency-domain resources in the initial transmission resource pool and re-transmission frequency-domain resources in the re-transmission resource pool have a one-to-one mapping relationship; and sending random access configuration information, wherein the random access configuration information comprises resource configuration information for the initial transmission resource pool and resource configuration information for the re-transmission resource pool.

According to a sixth aspect of an example of the disclosure, a non-transitory computer readable storage medium is provided having an executable program stored thereon, and steps of a method for random access are implemented when the executable program is executed by a processor, the method comprises:

randomly selecting an initial transmission frequency-domain resource in an initial transmission resource pool of a physical random access channel (PRACH) to initially transmit a random access preamble; and selecting a re-transmission frequency-domain resource, corresponding to the initial transmission frequency-domain resource, in a re-transmission frequency-domain resource pool of the PRACH to re-transmit the random access preamble, wherein the initial transmission frequency-domain resources in the initial transmission resource pool and the re-transmission frequency-domain resources in the re-transmission resource pool have a one-to-one mapping relationship.

DETAILED DESCRIPTION

Examples will be described in detail herein and illustrated in the accompanying drawings. When the following description refers to the accompanying drawings, the same numbers in different drawings represent the same or similar elements unless otherwise indicated. The implementations described in the following examples do not represent all implementations consistent with the examples of the application. Rather, they are merely examples of an apparatus and a method consistent with some aspects of the examples of the application.

Terms used in the examples of the disclosure only intend to describe specific example rather than limit the examples of the disclosure. A singular form 'a' and 'the' used in the examples of the disclosure intends to include a plural form unless other meanings are set forth clearly in context. It should be further understood that terms 'and/or' used herein refer to and contain any or all possible combinations of one or more related listed items.

It should be appreciated that terms like first, second, third and the like may be used in the examples of the disclosure for describing various information, but these information is not supposed to be limited by these terms. These terms are only used for distinguishing information of the same type. For example, without departing from the scope of the examples of the disclosure, first information may be also called second information, and likewise, the second information may be also called first information. Depending on the context, a word 'if' used herein may be constructed as 'when . . . ' or 'in response to determining'.

Figure 1:
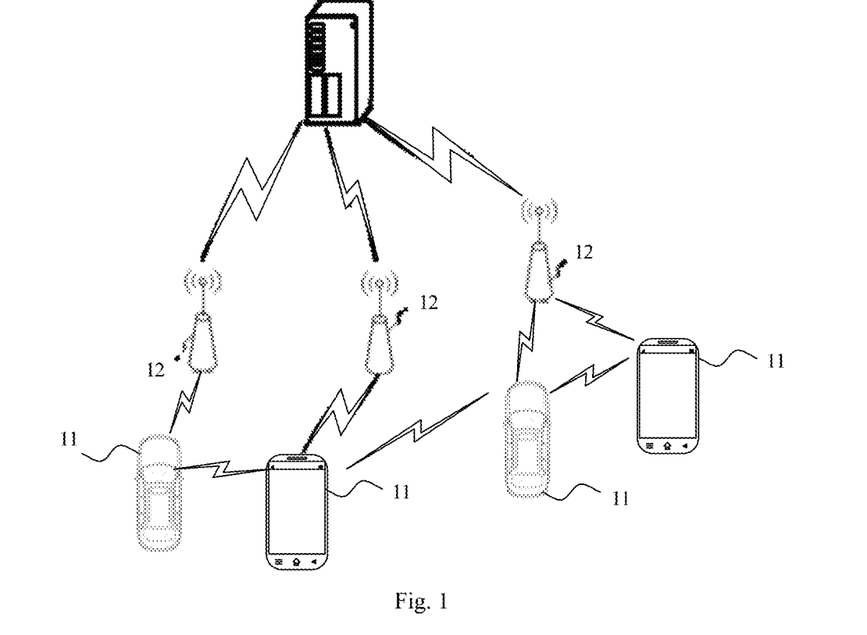
FIG. 1 is a schematic structural diagram of a wireless communication system provided by an example of the application.

FIG. 1 illustrates a schematic structural diagram of a wireless communication system provided by an example of the disclosure. As shown in FIG. 1, the wireless communication system is a communication system based on a cellular mobile communication technology and may include a plurality of terminals 11 and a plurality of base stations 12.

The terminals 11 may refer to devices for providing a voice and/or data connectivity for a user. The terminals 11 may perform communication with one or more core networks through a radio access network (RAN) and may be an Internet-of-Things terminal, such as a sensor device, a mobile phone (or called a cell phone) and a computer with the Internet-of-Things terminal, for example, a fixed or portable or pocket or hand-held or computer built-in or vehicle-mounted device. For example, the terminals 11 may be a station (STA), a subscriber unit, a subscriber station, a mobile station, a mobile, a remote station, an access point, a remote terminal, an access terminal, a user terminal, a user agent, a user device or user equipment (UE). Or the terminals 11 may be a device of an unmanned aerial vehicle. Or the terminals 11 may be a vehicle-mounted device, for example, a trip computer with a wireless communication function or a wireless communication device externally connected with a trip computer. Or the terminals 11 may be a roadside device, for example, a street lamp, a signal lamp or other roadside infrastructures, etc. with a wireless communication function.

The base stations 12 may be a network-side device in the wireless communication system. The wireless communication system may be a $4^{th}$ generation (4G) mobile communication system, also called a long term evolution (LTE)

system. Or the wireless communication system may be a 5G system, also called a new radio (NR) system or a 5G NR system. Or the wireless communication system may be a next generation system of the 5G system. An access network in the 5G system may be called a new generation-radio access network (NG-RAN). Or the wireless communication system may be an MTC system.

The base stations 12 may be an evolved NodeB (eNB) in the 4G system. Or the base stations 12 may be a base station adopting a centralized and distributed architecture (gNB) in the 5G system. The base stations 12 usually include a central unit (CU) and at least two distributed units (DU) when adopting the centralized and distributed architecture. Protocol stacks for a packet data convergence protocol (PDCP) layer, a radio link control (RLC) layer and a media access control (MAC) layer are arranged in the central unit, a protocol stack for physical (PHY) layer is arranged in the distributed units, and the examples of the disclosure do not limit a specific implementation of the base stations 12.

The base stations 12 and the terminals 11 may be in wireless connection through a wireless radio. In different implementations, the wireless radio is based on a $4^{th}$ generation (4G) mobile communication network technology standard or based on a $5^{th}$ generation (5G) mobile communication network technology standard, for example, the wireless radio is a new radio. Or the wireless radio may be based on a next generation mobile communication network technology standard of 5G.

In some examples, end to end (E2E) connection may be established between the terminals 11, for example, scenarios of vehicle to vehicle (V2V) communication, vehicle to infrastructure (V2I) communication, vehicle to pedestrian (V2P) communication, etc. in vehicle to everything (V2X) communication.

In some examples, the wireless communication system may further include a network management device 13.

The plurality of base stations 12 may be connected with the network management device 13 respectively. The network management device 13 may be a core network device in the wireless communication system, for example, the network management device 13 may be a mobility management entity (MME) in an evolved packet core (EPC). Or the network management device may be other core network devices, for example, a serving gateway (SGW), a public data network gateway (PGW), a policy and charging rules function (PCRF) or a home subscriber server (HSS), etc. The examples of the disclosure do not limit an implementation form of the network management device 13.

Figure 2:
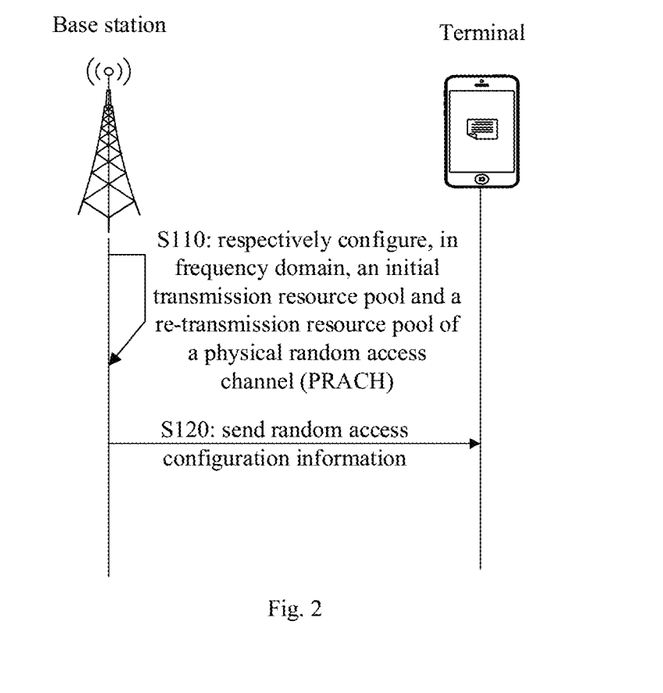
FIG. 2 is a schematic flowchart of a method for random access provided by an example of the application.

As shown in FIG. 2, an example provides a method for random access, including:

step S110: an initial transmission resource pool and a re-transmission resource pool of a physical random access channel (PRACH) are respectively configured in frequency domain. frequency-domain resources in the initial transmission resource pool are used for initial transmission of a random access preamble, frequency-domain resources in the re-transmission resource pool are used for re-transmission of the random access preamble, and initial transmission frequency-domain resources in the initial transmission resource pool and re-transmission frequency-domain resources in the re-transmission resource pool have a one-to-one mapping relationship; and step S120: random access configuration information is sent. The random access configuration information includes resource configuration information for the initial transmission resource pool and resource configuration information for the re-transmission resource pool.

The initial transmission resource pool and the re-transmission resource pool of the PRACH are allocated in the frequency domain in the examples of the application. By configuring the re-transmission resource pool and the initial transmission resource pool, during one random access process, initial transmission of the random access preamble may be performed based on the frequency-domain resource in the initial transmission resource pool, and re-transmission of the random access preamble may be performed based on the frequency-domain resource in the re-transmission resource pool, in this way, the success rate of random access can be increased through repeated transmission of the random access preamble.

In the example, the method for random access is applied to a network device of a network side, for example, various base stations, specifically, a 3G base station, a 4G base station, a 5G base station, a macro base station, a micro base station or a small base station, etc.

In the example, the network-side device divides, in frequency domain, resources of the PRACH into initial transmission resources special for initial transmission and re-transmission resources special for re-transmission.

In the example, the frequency-domain resources in the initial transmission resource pool are used for initial transmission of a random access preamble in one random access process, and the initial transmission herein is first-time transmission. The frequency-domain resources in the re-transmission resource pool are used for non-first-time transmission, namely re-transmission of the random access preamble in this random access process.

The random access preamble may be any random access preamble randomly selected from a random access preamble set. In the example, the random access preamble used by initial transmission is the same as the random access preamble used by re-transmission in one random access process of the terminal.

The random access configuration information is issued after the configuration is completed. For example, a base station issues the random access configuration information to the terminal, and the random access configuration information may be sent through a broadcast channel, a multicast channel or a unicast channel.

As the initial transmission resource pool and the re-transmission resource pool are configured, the terminal may perform initial transmission of the random access preamble based on the initial transmission resource pool and re-transmission by using the frequency-domain resources in the re-transmission resource pool. In this way, the terminal may perform repeated transmission of the random access preamble in one random access process, so that a phenomenon of a long random access time delay and a low success rate of random access due to only one time transmission of the random access preamble in one random access process is reduced.

Figure 3:
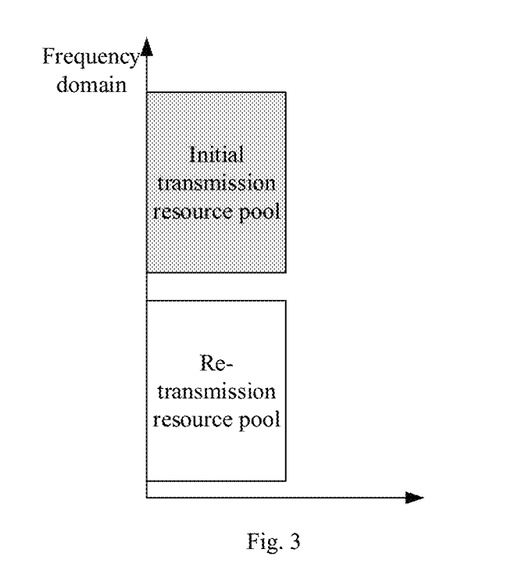
FIG. 3 is a schematic diagram of division of resource pools of a PRACH in frequency domain provided by an example of the application.

FIG. 3 shows that the resources of the PRACH are divided in the frequency domain, forming a schematic diagram of the initial transmission resource pool and the re-transmission resource pool as shown in FIG. 3.

In the example, the quantity of frequency-domain resources contained in the initial transmission resource pool may be equal to that of the frequency-domain resources contained in the re-transmission resource pool. For example, the initial transmission resource pool includes N carrier waves, and the re-transmission resource pool also includes N carrier waves. For another example, the initial transmission resource pool includes M sub-bands, and the re-transmission resource pool also includes M sub-bands.

In the example, a one-to-one mapping relationship is established between the frequency-domain resources in the initial transmission resource pool and the frequency-domain resources in the re-transmission resource pool. Namely, one frequency-domain resource in the initial transmission resource pool corresponds to one frequency-domain resource in the re-transmission resource pool.

Figure 4:
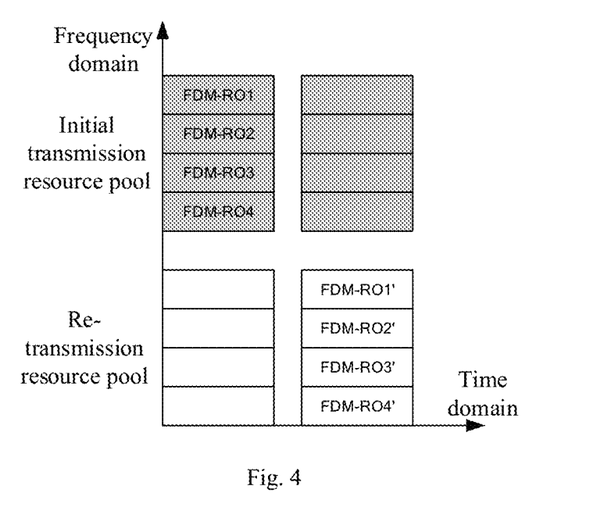
FIG. 4 is another schematic diagram of division of resource pools of a PRACH in frequency domain provided by another example of the application.

FIG. 4 is a schematic diagram of an initial transmission resource pool and a re-transmission resource pool provided by an example of the disclosure. It may be seen from FIG. 4 that the initial transmission resource pool and the re-transmission resource pool include the same quantity of frequency-domain resources; and in the frequency domain, a corresponding relationship is established between FDM-RO1 and FDM-RO1', a corresponding relationship is established between the FDM-RO2 and FDM-RO2', a corresponding relationship is established between FDM-RO3 and FDM-RO3', and a mapping relationship is established between FDM-RO4 and FDM-RO4'. It may be seen that the frequency-domain resources in the initial transmission resource pool are in one-to-one correspondence with the frequency-domain resources in the re-transmission resource pool. However, transmission occasions of the initial transmission and the re-transmission of the random access preamble are different, namely, ROs are different, so that the initial transmission resources and the re-transmission resources of the random access preamble are separated in time domain.

On the basis of the one-to-one mapping relationship between the frequency-domain resources in the initial transmission resource pool and the frequency-domain resources in the re-transmission resource pool, if the terminal sends the random access preamble using frequency-domain resource A in the initial transmission resource pool, re-transmission of the random access preamble will be performed by using frequency-domain resource B in the re-transmission resource pool corresponding to the frequency-domain resource A during the re-transmission of the random access preamble.

In this way, when the base station receives the initial transmission and the re-transmission of the terminal in one random access process at the same time, the base station may determine which random access preambles belong to the same terminal on the basis of the one-to-one mapping relationship between the frequency-domain resources in the initial transmission resource pool and the frequency-domain resources in the re-transmission resource pool. Thus, as compared with the confusion and resource wastes caused by sending one random access response every time one random access preamble is sent, it can reduce the confusion and resource wastes caused by sending multiple random access responses for multiple random access preambles of the same terminal. In the example, the base station sends only one random access response for multiple random access preambles sent by the terminal.

In a word, in the example, the network-side device (for example, the base station), etc. will issue the random access configuration information, and the terminal may perform random access on the basis of the random access configuration information after receiving the random access configuration information. By adopting the random access configuration information provided in the example, the terminal is allowed to repeatedly send a random access request (the random access request carries the random access preamble) in one random access process, and the frequency-domain resources on the PRACH adopted during initial transmission and re-transmission are different. In this way, the base station receives the random access preamble on a PRACH random access resource and then knows whether the current transmission is the initial transmission or the re-transmission according to the transmission resource of the random access preamble, reducing the phenomenon of repeated response to one random access preamble-based repeated random access request due to the fact that the base station fails in distinguishing whether it is the initial transmission or the re-transmission of the random access preamble in one random access process, and reducing random access confusion and resource wastes caused by the phenomenon of the repeated response.

In some examples, step S120 may include:
  the random access configuration information is sent through RRC signaling.

In the example, information carrying the random access configuration information is sent through the radio resource control (RRC) signaling. For example, the RRC signaling carries a system information block (SIB), and in some examples, the SIB carries the random access configuration information.

In this way, the terminal receives the RRC signaling so as to obtain the random access configuration information.

In some examples, the random access configuration information may further include: the maximum number of re-transmission of the random access preamble.

In some examples, the method for random access further includes:
  the random access preamble is received; and
  whether the received random access preamble is initially transmitted or re-transmitted is determined according to a transmission frequency-domain resource thereof with reference to the random access configuration information.

The random access preamble is received from the terminal and may be carried in the random access request. The random access request may further carry a terminal identification of the sending terminal, etc.

In the example, whether the random access preamble received this time is re-transmitted or initially transmitted random access preamble may be determined according to the transmission frequency-domain resource of the received random access preamble.

For example, the transmission frequency-domain resource of the received random access preamble is matched with the frequency-domain resources in the re-transmission resource pool and the initial transmission resource pool respectively, if the transmission frequency-domain resource of the received random access preamble is located in the initial transmission resource pool, the random access preamble received this time is initially transmitted random access preamble, and if the transmission frequency-domain resource of the received random access preamble is located in the re-transmission resource pool, the random access preamble received this time is re-transmitted random access preamble.

In some examples, the method may further include:
  if the received random access preamble is re-transmitted random access preamble, an initial transmission frequency-domain resource of the received random access preamble is determined according to the mapping relationship.

After the initial transmission frequency-domain resource of the received random access preamble is determined, in some examples, the method for random access further includes:

a radio network temporary identifier RA-RNTI is determined according to an initial transmission resource location of the random access preamble; and the random access response is sent based on the RA-RNTI.

If the base station receives the random access preamble sent by the terminal, the base station determines the RA-RNTI according to the initial transmission resource location of the random access preamble before sending the random access response to the terminal. For example, the base station receives only the initial transmission of the random access preamble and then may determine the RA-RNTI directly according to the initial transmission resource location of the initial transmission.

If the base station receives the re-transmission of the random access preamble, the initial transmission resource location of the random access preamble may be determined directly according to the corresponding relationship between the frequency-domain resources of the re-transmission and the initial transmission, and then the RA-RNTI is determined.

In this way, even if the base station does not succeed in receiving the initial transmission of the random access preamble, the RA-RNTI may be determined as long as the re-transmission of the random access preamble is received, then scrambling of the RAR is performed based on the RA-RNTI, the random access of the terminal is successful through sending of the RAR, and thus the access success rate is increased.

In some examples, the method further includes:

an uplink message returned based on the random access response is received; and a downlink message representing random access success is sent based on the uplink message.

The uplink message is also called a third message (MSG3), and the uplink message may include at least one of the following:

RRC connection request message, used for the terminal to request to establish a connection with the base station;

service scheduling request information, used for the terminal to request to schedule uplink service and/or downlink service; and service data, for example, transmission of small data packets. The small data packets may be data packets with a data volume being smaller than a data volume threshold value. In this way, the small data packets are sent directly in the random access process, transmission time delay of these small data packets is reduced, and re-transmission is not needed after the random access succeeds.

The downlink message is also called a fourth message (MSG4), the fourth message includes a message indicating a random access conflict solution, and the random access conflict solution means that the random access of the corresponding terminal succeeds.

In the example, the method may include: the RAR is sent for one or more received random access preambles.

If the base station already sends the RAR based on the initially-transmitted random access preamble, the RAR is not sent any more when the re-transmitted random access preamble is received. If the initially-transmitted random access preamble is not received successfully and a plurality of terminals adopt the same random access preamble to send random access requests during initial transmission, the base station does not send the RAR for the same random access preamble sent by the plurality of terminals. However, if only one terminal adopts the random access preamble during re-transmission of the random access preamble, the base station sends the RAR for the random access preamble, scrambling of the RAR is generated based on the initial transmission resource location.

Figure 5:
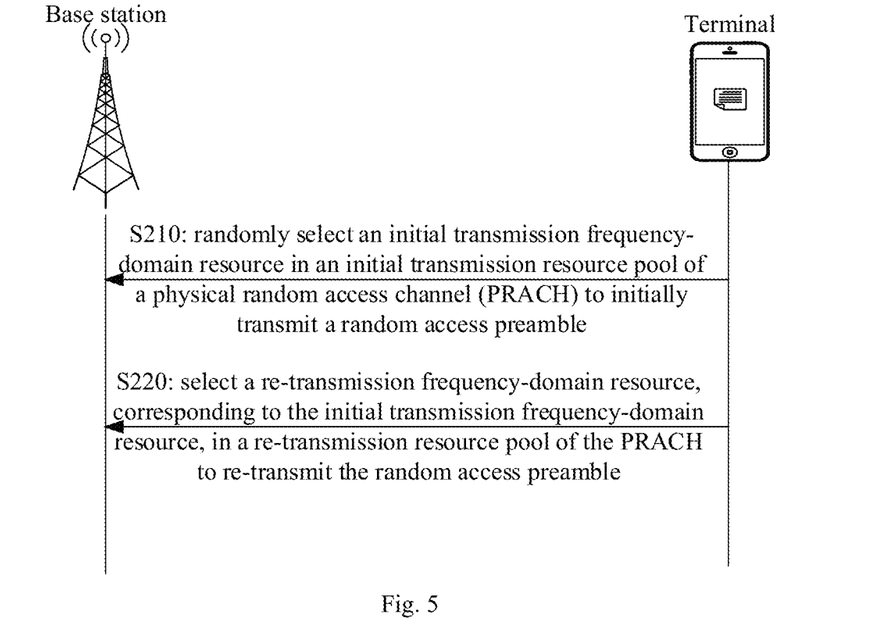
FIG. 5 is a schematic flowchart of another method for random access provided by an example of the application.

As shown in FIG. 5, the example provides a method for random access, including:

step S210: the initial transmission frequency-domain resource is randomly selected in the initial transmission resource pool of the physical random access channel (PRACH) to initially transmit the random access preamble; and step S220: the re-transmission frequency-domain resource corresponding to the initial transmission frequency-domain resource is selected in the re-transmission resource pool of the physical random access channel (PRACH) to re-transmit the random access preamble.

In the example, the method for random access is applied to the terminal, the terminal may randomly select the initial transmission frequency-domain resource in the initial transmission resource pool of the PRACH to perform the initial transmission of the random access preamble. In one random access process, if the re-transmission resource pool is configured, then the terminal may further select the re-transmission frequency-domain resource from the re-transmission resource pool to perform re-transmission of the random access preamble, in this way, in one random access process, the terminal may repeatedly send the same random access preamble, and the success rate of the random access may be increased. In some examples, in the example, during the initial transmission and the re-transmission of the random access preamble, the frequency-domain resource is selected from the initial transmission resource pool and the re-transmission resource pool which are already divided for transmission of the random access preamble, the terminal may know whether the random access preamble is initially transmitted or re-transmitted according to the resources used by the random access preamble, and the confusion of transmission by randomly selecting the resources and the resource wastes caused by repeatedly sending the RAR to the same terminal are reduced.

In some examples, the method further includes:

the random access response (RAR) is received. The random access response is determined according to the initial transmission resource location and scrambled with the ratio network temporary identifier RA-RNTI.

In the example, the terminal may receive the RAR, and the RAR is determined according to the initial transmission resource location during the initial transmission or re-transmission of the random access preamble by the terminal.

In some examples, the method further includes:

the uplink message is sent based on the RAR; and the downlink message sent based on the uplink message and representing random access success is received.

The uplink message may be the above MSG3, and the downlink message may be the above MSG4.

Figure 6:
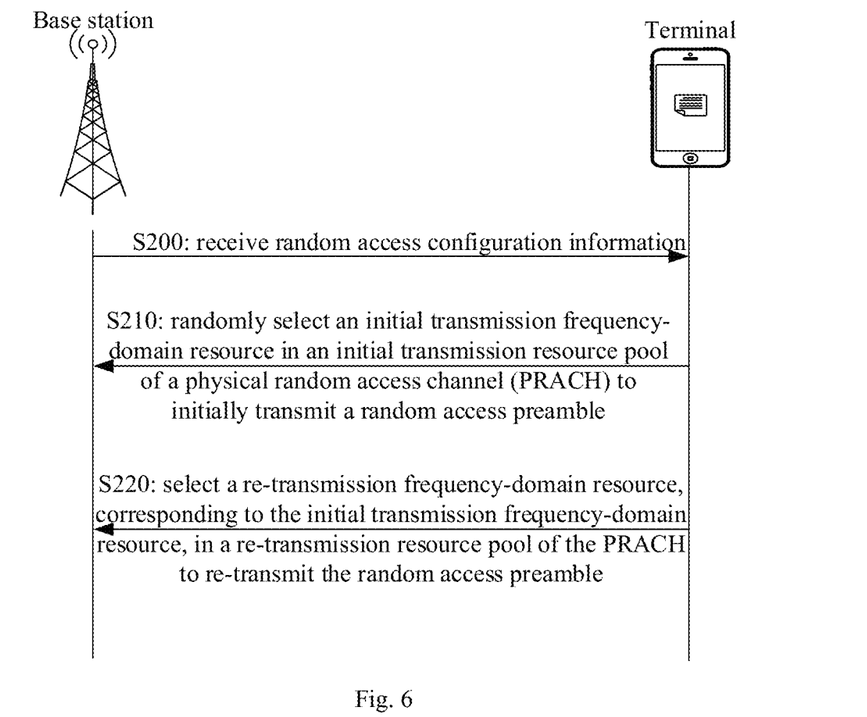
FIG. 6 is a schematic flowchart of yet another method for random access provided by an example of the application.

In some examples, as shown in FIG. 6, the method for random access further includes:

step S200: the random access configuration information is received. The random access configuration information includes:

the resource configuration information for the initial transmission resource pool; and the resource configuration information for the re-transmission resource pool.

In the example, the terminal needs to receive the random access configuration information before sending the random access preamble, and the random access configuration information includes the resource configuration information for the initial transmission resource pool and the resource configuration information for the re-transmission resource pool. Thus, the terminal simply determines the resources contained in the initial transmission resource pool and the resources contained in the re-transmission resource pool according to the random access configuration information.

In some examples, the random access configuration information further includes:

the maximum number of re-transmission of the random access preamble.

In the example, the random access configuration information further includes the maximum number of re-transmission. For example, the maximum number of re-transmission may be a positive integer. The terminal may know the maximum number of re-transmitting the random access preamble in one random access process by limiting the maximum number of re-transmission. For example, the maximum number of re-transmission is S, the random access preamble may be re-transmitted for S times at maximum in one random access process, and plus the initial transmission, the random access preamble may be re-transmitted for S+1 times at maximum in one random access process.

In some examples, step S200 may include: the random access configuration information is received through the radio resource control (RRC) signaling.

In the example, the random access configuration information is received through the RRC signaling, namely, the RRC signaling carries the random access configuration information.

In some examples, the method for random access further includes:

the re-transmission of the random access preamble is stopped when the actual number of re-transmission of the random access preamble reaches the maximum number of re-transmission.

In the example, the random access preamble may be sent in a random access window at intervals of preset time. When the actual number of re-transmission of the random access preamble reaches the maximum number of re-transmission, the re-transmission of the random access preamble is stopped, and a phenomenon of more intensive contention of the random access due to ceaseless re-transmission is reduced.

Figure 7:
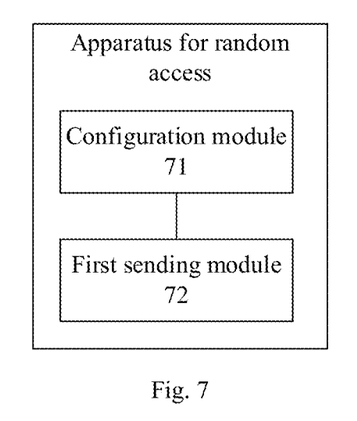
FIG. 7 is a schematic structural diagram of an apparatus for random access provided by an example of the application.

As shown in FIG. 7, an example provides an apparatus for random access, including:

a configuration module 71, configured to respectively configure, in frequency domain, an initial transmission resource pool and a re-transmission resource pool of a physical random access channel (PRACH), frequency-domain resources in the initial transmission resource pool are used for initial transmission of a random access preamble, frequency-domain resources in the re-transmission resource pool are used for re-transmission of the random access preamble, and initial transmission frequency-domain resources in the initial transmission resource pool and re-transmission frequency-domain resources in the re-transmission resource pool have a one-to-one mapping relationship; and a first sending module 72, configured to send random access configuration information, and the random access configuration information includes resource configuration information for the initial transmission resource pool and resource configuration information for the re-transmission resource pool.

In some examples, both the configuration module 71 and the first sending module 72 may be program modules. After the program modules are executed by a processor, configuration of the above initial transmission resource pool and re-transmission resource pool and issuing of the random access configuration information may be realized.

In some other examples, both the configuration module 71 and the first sending module 72 may be software and hardware combined modules. The software and hardware combined modules include, but are not limited to, various programmable arrays. The programmable arrays include, but are not limited to, a complex programmable array or a field programmable array.

In some other examples, both the configuration module 71 and the first sending module 72 may be pure hardware modules. The pure hardware modules include, but are not limited to, an application-specific integrated circuit.

In some examples, the first sending module is configured to send the random access configuration information through the radio resource control (RRC) signaling.

In some examples, the random access configuration information further includes the maximum number of re-transmission of the random access preamble.

In some examples, the apparatus further includes:

a first receiving module, configured to receive the random access preamble; and a first determining module, configured to determine whether the received random access preamble is initially transmitted or re-transmitted random access preamble according to the transmission frequency-domain resource of the received random access preamble with reference to the random access configuration information.

In some examples, the apparatus further includes:

a second determining module, configured to determine an initial transmission frequency-domain resource of the received random access preamble according to the mapping relationship if the received random access preamble is re-transmitted random access preamble.

In some examples, the apparatus for random access further includes:

a third determining module, configured to determine a radio network temporary identifier RA-RNTI according to an initial transmission resource location of the random access preamble; and a scrambling module, configured to scramble a random access response (RAR) sent for the random access preamble on the basis of the RA-RNTI.

The first sending module 72 is further configured to send one RAR for one or more received random access preambles.

Figure 8:
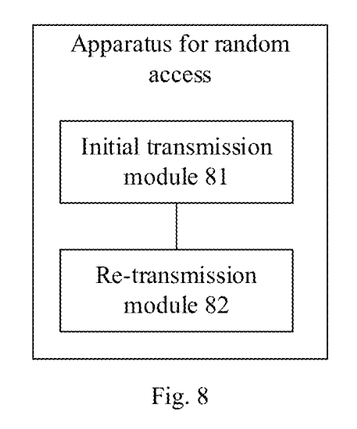
FIG. 8 is a schematic structural diagram of another apparatus for random access provided by an example of the application.

As shown in FIG. 8, the example provides an apparatus for random access, including:

an initial transmission module 81, configured to randomly select an initial transmission frequency-domain resource in an initial transmission resource pool of a physical random access channel (PRACH) to initially transmit a random access preamble; and a re-transmission module 82, configured to select a re-transmission frequency-domain resource, corresponding to the initial transmission frequency-domain resource, in a re-transmission resource pool of the physical random access channel (PRACH) to re-transmit the random access preamble, and the initial transmission frequency-domain resources in the initial transmission resource pool and the re-transmission frequency-domain resources in the re-transmission resource pool have a one-to-one mapping relationship.

In the example, both the initial transmission module 81 and the re-transmission module 82 are program modules. After the program modules are executed by a processor, the initial transmission and the re-transmission of the random access preamble may be realized.

In some other examples, both the initial transmission module 81 and the re-transmission module 82 may be software and hardware combined modules. The software and hardware combined modules include, but are not limited to, various programmable arrays. The programmable arrays include, but are not limited to, a complex programmable array or a field programmable array.

In some other examples, both the initial transmission module 81 and the re-transmission module 82 may be pure hardware modules. The pure hardware modules include, but are not limited to, an application-specific integrated circuit.

In some examples, the apparatus further includes:
a first receiving module, configured to receive the random access response (RAR). The random access response is determined according to the initial transmission resource location and scrambled with the RA-RNTI.

In some examples, the apparatus further includes:
a first receiving module, configured to receive random access configuration information. The random access configuration information includes:
resource configuration information for the initial transmission resource pool; and
resource configuration information for the re-transmission resource pool.

In some examples, the random access configuration information further includes:
the maximum number of re-transmission of the random access preamble.

In some examples, the first receiving module is configured to receive the random access configuration information through the RRC signaling.

In some examples, the apparatus further includes:
a stopping module, configured to stop re-transmitting the random access preamble when the actual number of re-transmission of the random access preamble reaches the maximum number of re-transmission.

In some examples, the apparatus further includes:
a second sending module, configured to send the uplink message based on the RAR; and
a second receiving module, configured to receive the downlink message fed back based on the uplink message and representing random access success.

Several examples are provided below in combination with any of the above examples.

Example 1

Frequency-domain resources to which a PRACH corresponds are divided into two parts, namely, an initial transmission resource pool and a re-transmission resource pool, in a form of FDM, as shown in FIG. 3.

The maximum number of transmission of a random access preamble may be preset through high-layer signaling. The high-layer signaling includes but is not limited to RRC signaling. In some cases, the high-layer signaling may further include media access control (MAC) layer signaling.

A base station detects the random access preamble in all possible locations and judges whether the random access preamble is initially transmitted or re-transmitted by detecting a frequency-domain resource location of the random access preamble.

The base station calculates an RA-RNTI according to a resource location of an initially-transmitted random access preamble after detecting the initially-transmitted random access preamble and uses the RA-RNTI for signaling scrambling of a physical layer. For example, scrambling of a random access response is performed by using the RA-RNTI.

The re-transmission frequency-domain resources and the initial transmission frequency-domain resources meet a one-to-one mapping relationship in frequency domain so that the base station can conveniently recognize multiple random access preambles transmitted from the same UE.

As shown in FIG. 4, if a PRACH resource selected from the initial transmission resource pool by the base station is FDM-RO1, a resource location in the re-transmission resource pool is FDM-RO1'.

The mapping relationship brings the benefits that: even if two users select the same random access preamble index, as long as the two users select different PRACH resources to transmit the random access preamble during initial transmission, the two users may be distinguished according to transmission locations during re-transmission.

Example 2

A terminal obtains selectable resource configuration information of a PRACH from a system message before performing random access. The resource configuration information includes: resource location information and PRACH repeated transmission configuration information, such as the maximum number of re-transmission, etc.

When the terminal launches one random access attempt, firstly, an RO location is randomly selected from configured selectable initial transmission PRACH resource locations, and a certain random access preamble is selected to issue a random access request to a base station.

During subsequent N-times re-transmission, re-transmission PRACH resource locations are obtained in a one-to-one mode according to the selected initial transmission PRACH resource location, and the same random access preamble is sent for N times on the corresponding re-transmission resource locations of a re-transmission resource pool.

The base station judges whether the random access preamble is initially transmitted or re-transmitted by recognizing the resource location of the random access preamble and corresponds the re-transmission of the same UE with the initial transmission according to a resource mapping location.

The base station may recognize multiple random access preambles of the same UE, so that only one RAR is fed back to the terminal.

An RA-RNTI needed for scrambling of an RAR is calculated according to the detected initial transmission PRACH resource location, and a user side calculates the RNTI according to the known initial transmission PRACH resource location and performs descrambling on the RAR.

A PRACH repeated transmission mechanism is adopted in the random access process, increasing success probability of the random access request, and reducing random access time delay as a whole. However, in the related art, a problem of repeated RAR response is caused due to PRACH repeated transmission under a random access mechanism. The present solution distinguishes the initial transmission resource pool and the re-transmission resource pool in a form of FDM and regulates the mapping mode of the initial transmission resources and the re-transmission resources, thus the base station can judge whether the plurality of received random access preambles come from the same user through the PRACH resource locations, and the problem of the RAR repeated response is avoided. In this way, the RAR repeated response can be avoided by applying PRACH repeated transmission in the present solution, and purposes of increasing the random access success probability and shortening the random access time delay are realized.

The example provides a solution for avoiding the RAR repeated response under the PRACH repeated transmission mechanism in the random access process. The PRACH resources are divided into two resource pools, namely, the initial transmission resource pool and the re-transmission resource pool in the form of FDM, a one-to-one mapping solution of the initial transmission resources and the re-transmission resources is designed, so that the base station can distinguish the initial transmission and the re-transmission of the plurality of random access preambles from the same UE through detected random access preamble locations, and the RAR repeated response of the same UE is avoided.

An example further provides a communication device, including:

an antenna;

a memory; and a processor, connected with the antenna and the memory respectively, and configured to control the antenna to transmit and receive a wireless signal and to execute steps of the method for random access provided by any of the above examples by executing an executable program stored in the memory.

The communication device provided by the example may be the above terminal or base station. The terminal may be various man-mounted terminals or vehicle-mounted terminals. The base station may be various base stations, for example, a 4G base station or a 5G base station, etc.

The antenna may be various antennas, for example, a 3G antenna, a 4G antenna or a 5G antenna or other mobile antennas. The antenna may further include a WiFi antenna or a wireless charging antenna, etc.

The memory may include various storage media which are a non-transitory computer storage medium, and information stored thereon may be remembered after the communication device is powered off.

The processor may be connected with the antenna and the memory through buses and the like, and is configured to read the executable program stored in the memory to implement the method for random access shown in FIG. 2, FIG. 5 and/or FIG. 6 etc.

An example of the application further provides a non-transitory computer readable storage medium storing an executable program. Steps of the method for random access provided by any of the above examples are realized when the executable program is executed by the processor, for example, at least one method shown in FIG. 2, FIG. 5 and/or FIG. 6.

Figure 9:
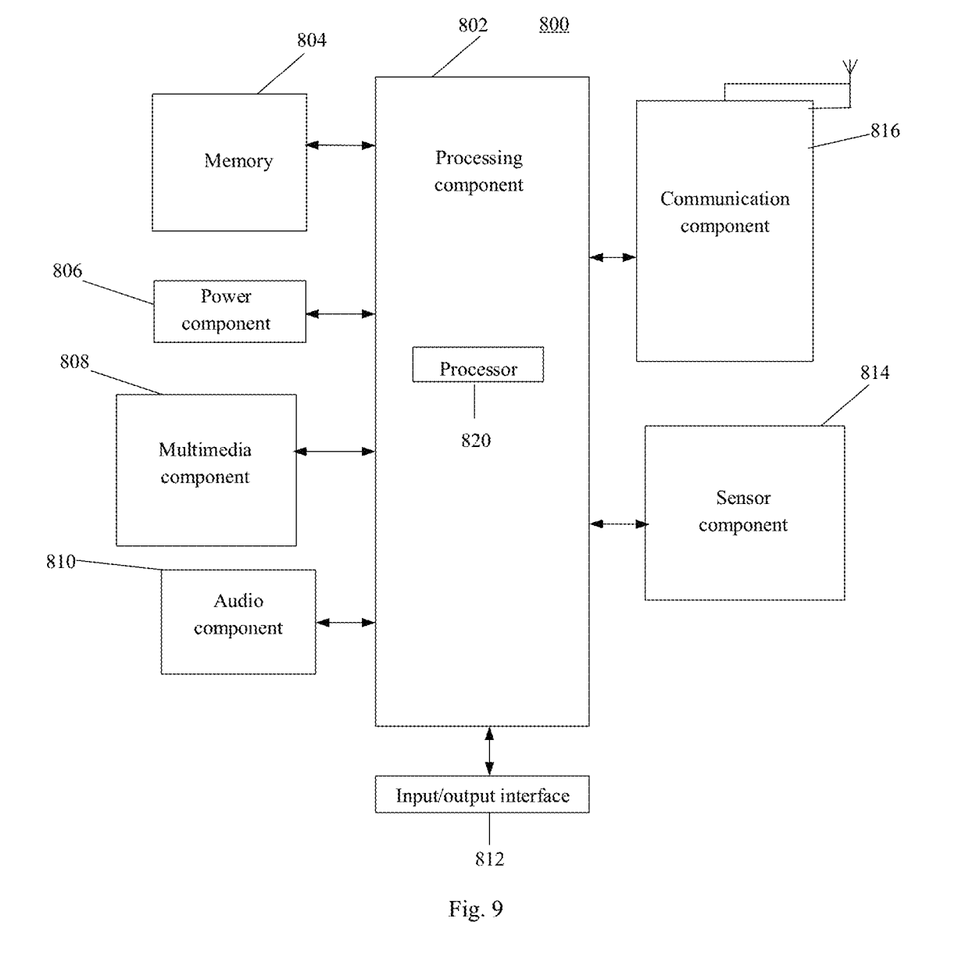
FIG. 9 is a schematic structural diagram of a terminal provided by an example of the application.

An example provides a terminal 800, as shown in FIG. 9. The terminal may be a mobile phone, a computer, a digital broadcast terminal, a messaging device, a game console, a tablet device, a medical device, a fitness facility, a personal digital assistant, etc.

Referring to FIG. 9, the terminal 800 may include one or more components as follows: a processing component 802, a memory 804, a power component 806, a multimedia component 808, an audio component 810, an input/output (I/O) interface 812, a sensor component 814 and a communication component 816.

The processing component 802 generally controls whole operation of the terminal 800, such as operations related to display, phone call, data communication, camera operation and recording operation. The processing component 802 may include one or more processors 820 for executing instructions so as to complete all or part of steps of the above method. Besides, the processing component 802 may include one or more modules to facilitate interaction between the processing component 802 and the other components. For example, the processing component 802 may include a multimedia module so as to facilitate interaction between the multimedia component 808 and the processing component 802.

The memory 804 is configured to store various data so as to support operations on the terminal 800. Examples of these data include instructions of any application program or method for operation on the terminal 800, contact person data, telephone directory data, messages, pictures, videos and the like. The memory 804 may be realized by any type of volatile or non-volatile storage device or their combination, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or a compact disc.

The power component 806 provides power for the various components of the terminal 800. The power component 806 may include a power management system, one or more power sources, and other components related to power generation, management and distribution for the terminal 800.

The multimedia component 808 includes a screen which provides an output interface between the terminal 800 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 808 includes a front camera and/or a rear camera. When the terminal 800 is in an operation mode, such as a photographing mode or a video mode, the front camera and/or the rear camera can receive external multimedia data. Each front camera and each rear camera may be a fixed optical lens system or have a focal length and an optical zoom capability.

The audio component 810 is configured to output and/or input an audio signal. For example, the audio component 810 includes a microphone (MIC). When the terminal 800 is in the operation mode, such as a call mode, a recording mode and a voice recognition mode, the microphone is configured to receive an external audio signal. The received audio signal may be further stored in the memory 804 or sent through the communication component 816. In some examples, the audio component 810 may further include a loudspeaker for outputting the audio signal.

The I/O interface 812 provides an interface between the processing component 802 and a peripheral interface module, and the peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the terminal 800. For example, the sensor component 814 may detect a start/shut-down state of the terminal 800 and relative positioning of the components. For example, the components are a display and a keypad of the terminal 800. The sensor component 814 may further detect position change of the terminal 800 or one component of the terminal 800, whether there is contact between the user and the terminal 800, and azimuth or speed up/speed down and temperature change of the terminal 800. The sensor component 814 may include a proximity sensor, configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the terminal 800 and the other devices. The terminal 800 may be accessed to a wireless network based on a communication standard, such as Wi-Fi, 2G or 3G, or their combination. In an example, the communication component 816 receives a broadcast signal or related broadcast information from an external broadcast management system through a broadcast channel In an example, the communication component 816 may further include a near-field communication (NFC) module so as to facilitate short-range communication. For example, the NFC module may be realized based on a radio frequency identification (RFID) technology, an infra-red data association (IrDA) technology, an ultra wide band (UWB) technology, a Bluetooth (BT) technology and other technologies.

In an example, the terminal 800 may be realized by one or more application specific integrated circuits (ASICs), a digital signal processor (DSP), a digital signal processing device (DSPD), a programmable logic device (PLD), a field-programmable gate array (FPGA), a controller, a microcontroller, a microprocessor or other electronic elements for executing the above method.

An example further provides a non-transitory computer readable storage medium including instructions, such as the memory 804 including the instructions. The instructions may be executed by the processor 820 of the terminal 800 so as to complete the above method. For example, the non-transitory computer readable storage medium may be an ROM, a random access memory (RAM), a CD-ROM, a magnetic tape, a floppy disk, an optical data storage device and the like.

The terminal may be configured to implement the above method for random access, for example, the method for random access in FIG. 2 and/or FIG. 6.

Figure 10:
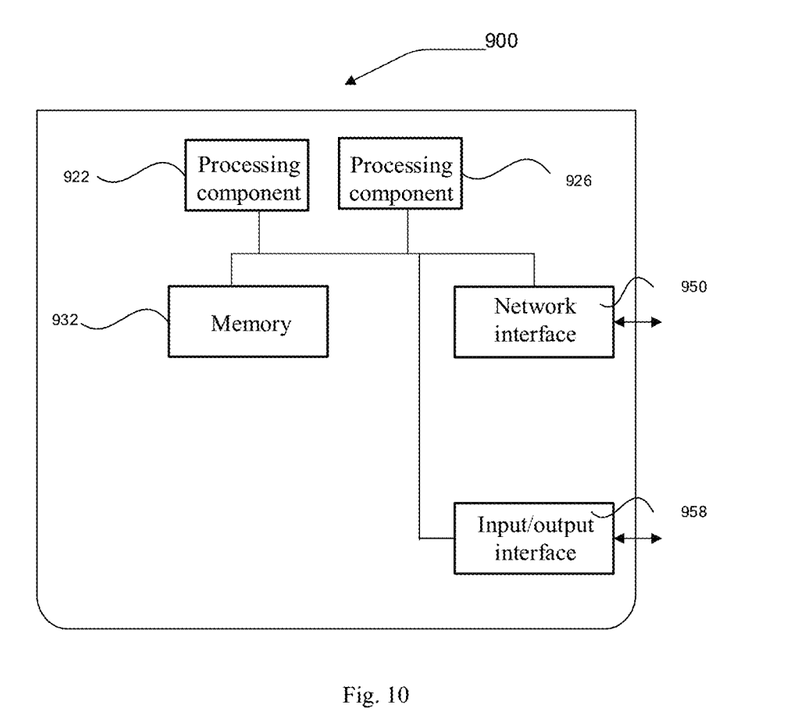
FIG. 10 is a schematic structural diagram of a base station provided by an example of the application.

FIG. 10 is a block diagram of a base station 900 shown according to an example. For example, the base station 900 may be provided as a network side device. Referring to FIG. 10, the base station 900 includes a processing component 922 which further includes one or more processor and a memory resource represented by a memory 932 configured to store instructions executable by the processing component 922, for example, an application program. The application program stored in the memory 932 may include one or more than one module each of which corresponds to a set of instructions. Besides, the processing component 922 is configured to execute the instructions so as to execute the above method for random access provided by any of the above examples, for example, the method shown in FIG. 2 and/or FIG. 6.

The base station 900 may further include a power component 926 configured to execute power management of the base station 900, a wired or wireless network interface 950 configured to connect the base station 900 to a network, and an input/output (I/O) interface 958. The base station 900 may operate an operation system stored in the memory 932, for example, a Windows Server™, Mac OS X™, Unix™, Linux™, FreeBSD™ and the like.

The wireless network interface 950 includes but is not limited to the antenna of the above communication device. Those skilled in the art will easily figure out other implementation solutions of the application after considering the specification and practicing the disclosure disclosed herein. The application intends to cover any transformation, application or adaptive change which conform to a general principle of the application and includes common general knowledge or conventional technical means which are not disclosed herein in the technical field. The specification and the examples are only regarded as exemplary, the true scope and spirit of the application are indicated by the following claims.

It should be understood that the application is not limited to an accurate structure described above and shown in the drawings and accepts various modifications and changes without departing from its scope. The scope of the application is limited only by the appended claims.

The invention claimed is:

1. A method for random access, comprising:
respectively configuring, in frequency domain, an initial transmission resource pool and a re-transmission resource pool of a physical random access channel (PRACH), wherein frequency-domain resources in the initial transmission resource pool are used for initial transmission of a random access preamble, frequency-domain resources in the re-transmission resource pool are used for re-transmission of the random access preamble, and initial transmission frequency-domain resources in the initial transmission resource pool and re-transmission frequency-domain resources in the re-transmission resource pool have a one-to-one mapping relationship;
sending random access configuration information, wherein the random access configuration information comprises resource configuration information for the initial transmission resource pool and resource configuration information for the re-transmission resource pool;
receiving the random access preamble; and
determining whether the received random access preamble is an initially transmitted or re-transmitted random access preamble according to a transmission frequency-domain resource of the received random access preamble with reference to the random access configuration information.

2. The method according to claim 1, wherein sending the random access configuration information comprises:
sending the random access configuration information through radio resource control (RRC) signaling.

3. The method according to claim 2, wherein the random access configuration information further comprises a maximum number of re-transmission of the random access preamble.

4. The method according to claim 1, further comprising:
determining an initial transmission frequency-domain resource of the received random access preamble according to the one-to-one mapping relationship if the received random access preamble is a re-transmitted random access preamble.

5. The method according to claim 1, further comprising:
determining a radio network temporary identifier (RA-RNTI) according to an initial transmission resource location of the random access preamble; and
performing scrambling on a random access response (RAR) sent for the random access preamble based on the RA-RNTI.

6. The method according to claim 5, further comprising:
receiving an uplink message returned based on the random access response; and
sending a downlink message representing random access success based on the uplink message.

7. The method according to claim 1, further comprising:
sending one random access response (RAR) for one or a plurality of received random access preambles.

8. A non-transitory computer readable storage medium, storing an executable program, wherein steps of the method for random access according to claim 1 are realized when the executable program is executed by a processor.

9. A method for random access, comprising:
randomly selecting an initial transmission frequency-domain resource in an initial transmission resource pool of a physical random access channel (PRACH) to initially transmit a random access preamble;
selecting a re-transmission frequency-domain resource, corresponding to the initial transmission frequency-domain resource, in a re-transmission resource pool of the PRACH to re-transmit the random access preamble, wherein the initial transmission frequency-domain resource in the initial transmission resource pool and re-transmission frequency-domain resources in the re-transmission resource pool have a one-to-one mapping relationship; and
receiving a random access response (RAR), wherein the RAR is determined according to an initial transmission resource location and scrambled with a radio network temporary identifier (RA-RNTI).

10. The method according to claim 9, further comprising:
sending an uplink message based on the RAR; and
receiving a downlink message fed-back based on the uplink message and representing random access success.

11. The method according to claim 9, further comprising:
receiving random access configuration information, wherein the random access configuration information comprises:
resource configuration information for the initial transmission resource pool; and
resource configuration information for the re-transmission resource pool.

12. The method according to claim 11, wherein the random access configuration information further comprises:
a maximum number of re-transmission of the random access preamble.

13. The method according to claim 11, wherein receiving the random access configuration information comprises:
receiving the random access configuration information through radio resource control (RRC) signaling.

14. The method according to claim 9, further comprising:
stopping re-transmitting the random access preamble when an actual number of re-transmission of the random access preamble reaches a maximum number of re-transmission.

15. A communication device, comprising:
an antenna;
a memory; and
a processor, connected with the antenna and the memory, and configured to, by executing an executable program stored in the memory, control the antenna to transmit and receive a wireless signal and capable of executing steps of the method for random access according to claim 9.

16. A non-transitory computer readable storage medium, storing an executable program, wherein steps of the method for random access according to claim 9 are realized when the executable program is executed by a processor.

17. A communication device, comprising:
an antenna;
a memory; and
a processor, connected with the antenna and the memory, and configured to, by executing an executable program stored in the memory, control the antenna to transmit and receive a wireless signal and further configured to:
respectively configure, in frequency domain, an initial transmission resource pool and a re-transmission resource pool of a physical random access channel (PRACH), wherein frequency-domain resources in the initial transmission resource pool are used for initial transmission of a random access preamble, frequency-domain resources in the re-transmission resource pool are used for re-transmission of the random access preamble, and initial transmission frequency-domain resources in the initial transmission resource pool and re-transmission frequency-domain resources in the re-transmission resource pool have a one-to-one mapping relationship;
send random access configuration information, wherein the random access configuration information comprises resource configuration information for the initial transmission resource pool and resource configuration information for the re-transmission resource pool;
receive the random access preamble; and
determine whether the received random access preamble is an initially transmitted or re-transmitted random access preamble according to a transmission frequency-domain resource of the received random access preamble with reference to the random access configuration information.

* * * * *